United States Patent
Nelson et al.

[15] 3,653,191
[45] Apr. 4, 1972

[54] RECEIVER-SEPARATOR UNIT FOR LIQUID INJECTED GAS COMPRESSOR

[72] Inventors: Arvid L. Nelson; Gilbert Cirrincione, both of Quincy, Ill.

[73] Assignee: Gardner-Denver Company, Quincy, Ill.

[22] Filed: Oct. 16, 1969

[21] Appl. No.: 866,891

[52] U.S. Cl..................................55/310, 55/337, 55/417, 55/424, 55/482, 137/540, 417/295
[51] Int. Cl............................................B01d 50/00
[58] Field of Search..................55/213, 310, 337, 417, 418, 55/420, 424, 467, 470–473, 486, 487, 482; 417/295; 418/99; 137/540, 204

[56] References Cited

UNITED STATES PATENTS

| | | | |
|---|---|---|---|
| 2,058,189 | 10/1936 | Stuard | 137/204 |
| 2,234,488 | 3/1941 | Dick | 417/295 |
| 2,402,140 | 6/1946 | Heintzelman | 55/DIG. 17 |
| 2,864,461 | 12/1958 | Duecker | 55/213 |
| 3,070,977 | 1/1963 | Kimmel et al. | 62/473 |
| 3,241,537 | 3/1966 | Jones | 55/417 |
| 3,241,747 | 3/1966 | Mihalakis | 55/467 |
| 3,291,385 | 12/1966 | Williams et al. | 418/99 |
| 3,482,768 | 12/1969 | Cirrincione et al. | 417/26 |
| 3,499,270 | 3/1970 | Paugh | 55/473 |

*Primary Examiner*—Bernard Nozick
*Attorney*—Michael E. Martin

[57] ABSTRACT

A combination gas receiver-liquid separator unit for use in a liquid injected gas compressor system. The receiver-separator unit comprises an elongated cylindrical vessel having a transverse partition sealingly dividing the vessel into two separate compartments for separating liquid entrained in a flowing gas stream and for storing liquid-free gas under pressure. A check valve interposed between compartments prevents the backflow of liquid-free gas into the separator compartment. The separator compartment includes a primary inertial separation stage and secondary and tertiary impingement type separation stages. The secondary and tertiary separation stages comprise a removable separator element. The separator compartment also serves as a liquid reservoir for the associated gas compressor system.

8 Claims, 8 Drawing Figures

PATENTED APR 4 1972

3,653,191

SHEET 1 OF 3 inventors
Arvid L. Nelson
Gilbert Cirrinctone
by Michael E. Martin
agent

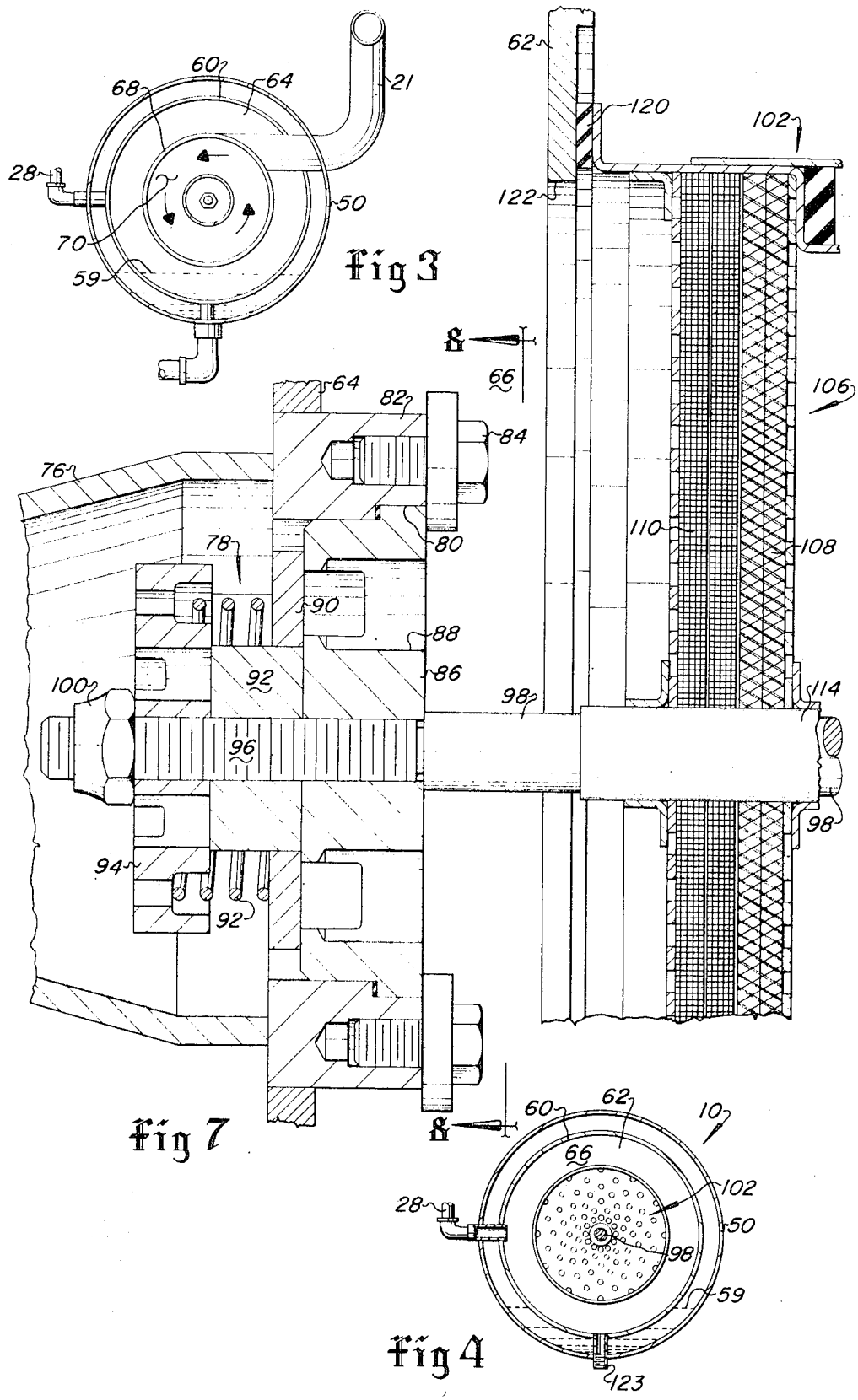

RECEIVER-SEPARATOR UNIT FOR LIQUID INJECTED GAS COMPRESSOR

BACKGROUND OF THE INVENTION

Liquid injected gas compressors usually include some type of combination liquid separator and compressed gas receiver unit or tank for separating the liquid entrained in the compressed gas and returning it to the compressor unit. The separated liquid is stored in a reservoir portion of the unit prior to being cooled and reinjected into the compressor.

Combination compressed gas receiver-liquid separator systems are known in the prior art. For example, U.S. Pat. No. 2,234,469 issued to Burns Dick discloses a combination air receiver-lubricating oil reservoir tank which is operable to be vented to atmosphere through a valve operated in conjunction with a compressor inlet throttling valve. This system provides a reduced pressure in the receiver-reservoir during compressor unloaded operation and, accordingly, reduces the power consumption of the compressor in a manner well known. During unloaded operation, the separator and oil reservoir portion of the unit is vented to atmosphere. The Dick disclosure also provides a separate vessel comprising a compressed gas receiver which receives oil-free air from the separator and is kept pressurized during unloaded operation by a check valve interposed between the separator and the secondary compressed gas receiver.

U.S. Pat. No. 3,291,385, issued to R.F. Williams et al., discloses a combined receiver-separator unit including a removable impingement type separation element and a series of transverse baffles in the combined unit comprising means for separating liquid entrained in compressed air discharged into the unit. This system provides gas separation in three stages with recirculation of the separated oil back to the compressor from three respective compartments in the unit. The Williams disclosure does not, however, provide for the combined unit to be vented to atmosphere during the unloaded operation of the compressor and, furthermore, does not provide for a separate gas receiver. Although the impingement or agglomerating element in the Williams patent is removable, an examination of FIG. 2 of the patent drawing will make clear the difficulty of removal of the agglomerator due to the fact that the compressed gas discharge valve must be removed before the agglomerator becomes accessible. Another example of prior art in gas-liquid separation apparatus is U.S. Pat. No. 1,532,657, issued to I. Fleishner. In Fleishner, separation is provided by the introduction of the compressed air by use of a tangentially disposed inlet pipe into a chamber such that the air takes a circuitous or spiral course along the wall of the chamber. The air is then filtered through an absorbent porous material prior to discharge.

The above mentioned prior art systems fail to provide the combination of centrifugal force for separation with impingement or absorbent type separating elements in a combination receiver-separator having an integral but separate compressed gas receiver compartment whereby the liquid separator compartment is operable to be vented to atmosphere during compressor unloaded operation. Accordingly, it is also desirable to provide means whereby an impingement type separator element may be easily removed from the separator compartment for servicing and replacement without disassembly of major conduits and associated fittings.

SUMMARY OF THE INVENTION

The present invention resides in the provision of an integral receiver-separator unit comprising separate compartments for receiving and separating liquid from a gas compressor discharge and for storing the liquid-free gas. The separator and gas receiver compartments include a conduit therebetween and a check valve disposed in said conduit operable to provide for keeping the gas receiver and storage compartment pressurized while the separator compartment is vented during unloaded operation of an associated gas compressor.

The liquid separator of the present invention also utilizes a three-stage separation process carried out in a compact separator compartment whereby compressed gas discharged to the gas receiver compartment as well as gas vented from the separator compartment during compressor unloaded operation receives total separation. By combining a primary inertial or centrifugal force separation process with secondary and tertiary impingement type separation, the receiver-separator apparatus of the present invention provides for final delivery of substantially liquid-free compressed gas.

The receiver-separator of the present invention also provides for minimizing the surface area of the liquid reservoir which is exposed to the circulating gas during the separation process thereby reducing the amount of liquid required to be separated as a result of foaming and agitation at the liquid-gas interface.

Further advantageous aspects of the present invention include the provision of an easily removable separator element which does not require prior disassembly of associated piping or other separator components. Also particularly advantageous in the present invention is the provision of separate liquid recirculation conduits for each separation stage whereby only the liquid separated by the respective stages is required to be drained therefrom.

BRIEF DESCRIPTION OF THE DRAWINGS

FIG. 3 is a sectional view taken along line 3—3 of FIG. 2;

FIG. 4 is a sectional view taken along line 4—4 of FIG. 2;

FIG. 7 is an enlarged sectional view of the check valve shown in FIG. 2; and,

DESCRIPTION OF THE PREFERRED EMBODIMENTS

Figure 1:
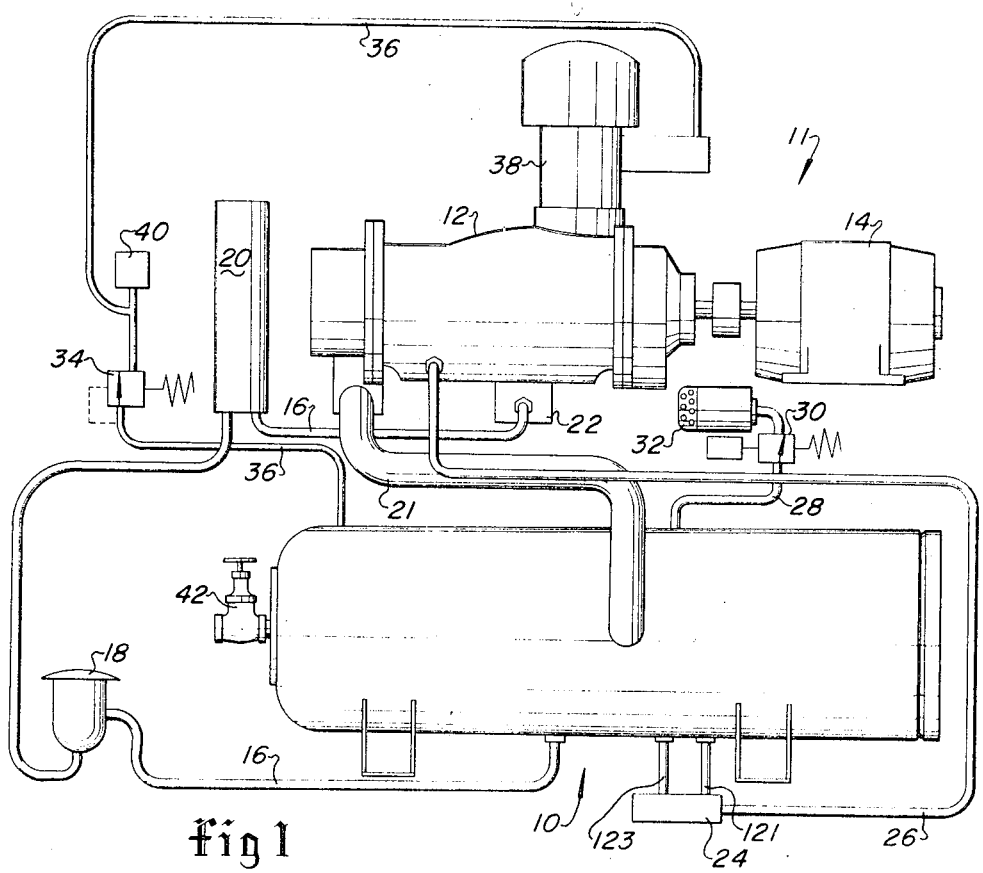
FIG. 1 is a schematic illustration of a liquid injected gas compressor system embodying an improved receiver-separator unit.

Referring to FIG. 1, of the drawing, a preferred form of the inventive receiver-separator tank is generally designated by the numeral 10 and is shown schematically in relation with a compressor unit 11 comprising an air compressor 12 connected to a compressor driving motor 14. Both the motor 14 and the compressor 12 are adapted to be mounted directly upon the tank 10 by means of brackets (not shown) welded thereto. The compressor 12 is of the positive displacement liquid injected rotary type. Compressors of this type are usually of the sliding vane or helical screw design although other types are known and used. Such compressors are widely used for industrial compressed air systems, and for various applications for compressing gases other than air. The injection liquid usually comprises a lightweight mineral oil, although such systems may utilize various other liquids.

The system of FIG. 1 is of a type generally well known in the art of oil injected air compressors. A quantity of oil is stored in a reservoir portion of the receiver-separator 10 and is communicated to the compressor 12 due to pressure differential therebetween by way of conduit 16. The oil also passes through a filter 18 and a heat exchanger 20 prior to injection into the compressor injection port 22. In a manner well known, the oil, subsequent to being injected into the compressor, is discharged with compressed air through a discharge conduit 21 to the receiver separator 10 and is separated for recirculation back to the compressor. The system of FIG. 1 also includes a manifold 24 which receives oil from a portion of the separator to be described herein and returns said oil to the compressor by way of conduit 26. The schematic of FIG. 1 also illustrates a control system for the compressor unit 11 which includes a conduit 28 leading from the tank 10 to a solenoid valve 30 and thence to an exhaust silencer 32. The control system further includes a pressure sensing valve 34 in communication with the tank 10 by way of conduit 36. The valve 34 is operable upon sensing a predetermined pressure to communicate compressed air from tank 10 to a compressor inlet throttling valve 38 for throttling the inlet of the compressor 12. The conduit 36 is also in communication with a pressure switch 40 which in turn is electrically connected to the valve 30. Liquid free air is conducted from the tank 10 by way of outlet means comprising a valve 42 attached thereto.

Figure 2:
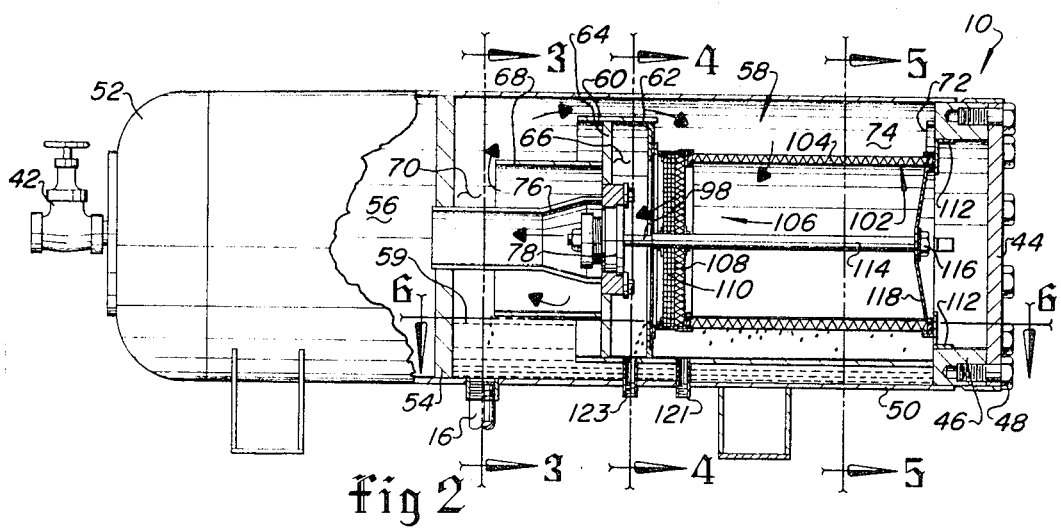
FIG. 2 is a sectional view of a portion of the improved separator-receiver showing a partial longitudinal section of the tank.

Referring to the illustrative embodiment of the improved receiver-separator tank shown in FIG. 2, the tank 10 comprises an elongated cylindrical vessel closed at one end by a removable head 44. The head 44 is fastened to an annular ring 46 by a plurality of threaded fasteners 48. The annular ring 46 is rigidly secured to the interior surface of the tank wall 50. Preferably, the length of the tank is several times greater than its diameter; and, the longitudinal axis of the tank is parallel to the supporting surface upon which it rests. The opposite end of the tank is closed by a curved wall portion 52. Intermediate the ends of the tank, a transverse partition 54 sealingly divides the tank into two separate compartments 56 and 58, compartment 56 being the compressed gas receiver portion of the tank and compartment 58 being the liquid separator and reservoir portion.

Figure 5:
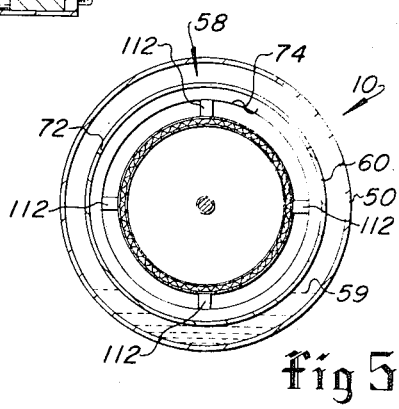
FIG. 5 is a sectional view taken along line 5—5 of FIG. 2.

The separator compartment 58 includes means defining a flow path and forming three chambers disposed to receive the air-oil mixture successively. Referring to FIGS. 2, 3, 4, and 5, a substantially cylindrical shell 60 extends from the annular ring 44 in coaxial relation with the longitudinal axis of the tank 10. The shell 60 includes a transverse partition 64 and an intermediate partition 62 forming a chamber 66 therebetween. Also extending in coaxial relation with the axis of the tank 10 is a cylindrical baffle 68 affixed at one end to the partition 64 and extending toward the partition 54. Referring to FIG. 3, it may be seen that the compressor discharge conduit 21 comprises the gas-liquid inlet means to the tank 10. The conduit 21 extends through the exterior wall 50 and terminates in tangential relationship with the interior wall of the cylindrical baffle 68. The general area between the partitions 54 and 64 and within the cylindrical baffle 68 comprises the separation chamber 70 for the primary stage of air-oil separation. Referring to FIG. 2 and FIG. 5, it may be seen that the cylindrical shell 60 has an arcuate sector opening 72 near the top which extends substantially between the partition 62 and the annular ring 56 thereby providing for fluid flow from chamber 70 to a secondary separation chamber 74 bounded by the shell 60, partition 62 and ring 46. Referring to FIG. 2, a tubular conduit 76 abuts the partition 64 and is operable to communicate the chamber 66 to the air receiver compartment 56, as shown.

Figure 8:
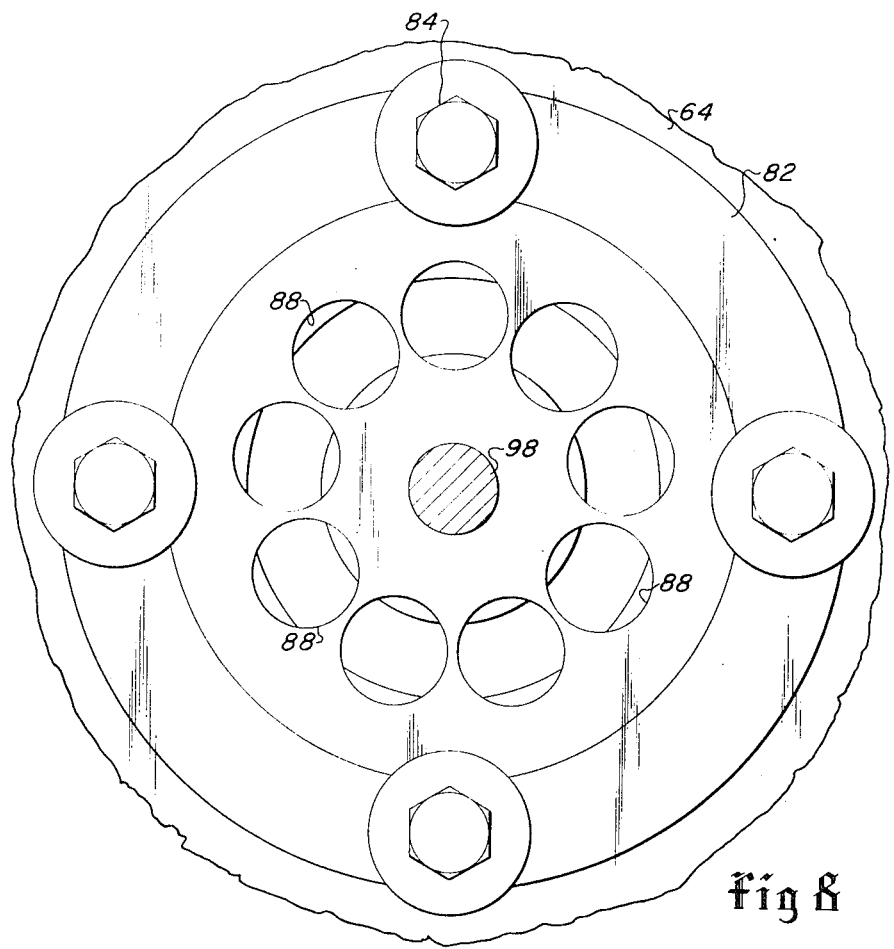
FIG. 8 is a sectional view taken along the line 8—8 of FIG. 7.

Referring to FIG. 7, situated in the flow path formed by conduit 76 is a check valve assembly 78. The check valve 78 is suitably mounted in a cylindrical counterbore 80 formed by a flanged portion 82 of the partition 64 and is retained therein by a plurality of threaded fasteners 84. The check valve 78 comprises a seat member 86 having a number of stepped openings 88 (see FIG. 8) therethrough. A closure member 90 suitably mounted on a guide 92 is operable to close over the openings 88 to prevent flow of fluid from compartment 56 to chamber 66. The check valve 78 also includes a spring 92 biasing the member 90 in the valve closed position, and a backup plate 94 supporting the spring 92 and limiting the movement of the member 90 in the open position. The check valve 78 is held in assembly on a threaded portion 96 of an elongated rod 98 by means of nut 100, as illustrated in FIG. 7. As may be seen in FIG. 2, the rod 98 extends substantially into the chamber 74 for a purpose to be explained herein.

FIGS. 2 and 7 illustrate the constructional details of an impingement type separator element 102 of a type well known and commercially available, also commonly referred to as an agglomerator. The agglomerator 102 comprises an elongated hollow cylinder having a wall 104 formed of a suitable foraminous or porous material such as fine mesh screening comprising the secondary separator element, and a transverse end wall 106 made up of a plurality of foraminous dislike pads 108 and 110 comprising the tertiary separator element. The agglomerator 102 is supported in the chamber 74 by integral brackets 112 (see FIGS. 2 and 5) suitably removably fastened to the annular ring 46. A centrally positioned tube 114 forming part of the agglomerator structure telescopically receives the rod 98, the latter also serving to support the agglomerator 102 by means of the nut 116 threaded over the end of rod 98 opposite the check valve 78. The nut 116 engages a transverse end plate 118 of the agglomerator. As may be seen in FIG. 7, the agglomerator 102 is sealingly engaged with the transverse baffle 62 by means of a resilient gasket 120 whereby fluid may flow through opening 122 into chamber 66 only after passing through the secondary and tertiary separator elements 104 and 108, 110, respectively.

The three-stage separation process referred to herein is accomplished by introducing the air-oil mixture from the compressor 18 by way of conduit 21 into the chamber 70 tangentially along the interior wall surface of the baffle 68. The induced vortical motion of the fluid stream created by the baffle 68 will result in separation of a substantial amount of liquid due to centrifugal force. Liquid will impinge the wall of the baffle 68 and flow downward along the wall and out of the open end of the baffle to form a reservoir pool in the compartment 58. After primary separation in chamber 70 the air-oil mixture flows into chamber 74 whereby the agglomerator 102 operates to perform the secondary and tertiary separation process. It is believed the separation process may also be better understood by a description of the operation of the system.

In operation, when the compressor 12 is running in the loaded condition an air-oil mixture enters the receiver-separator unit 10 by way of the compressor discharge conduit 21. The conduit 21 discharges the mixture tangentially into the cylindrical chamber formed by the cylindrical baffle 68. As the air-oil mixture enters the region formed by the inner cylindrical surface of the baffle 68 and the outer surface of tube 76, it impinges on both elements and is forced to flow in a vortiginous manner whereby centrifugal force causes separation of a large quantity of the entrained oil. The remaining air-oil mixture passes over the outside of baffle 68 and around and over the end of cylindrical shell 60 with some of the oil-air mixture impinging on the transverse partition 54 between the receiver compartment and the separator compartment. The mixture then passes into the secondary separation chamber 74, through the foraminous separator wall 104 of the agglomerator and then through transverse separators 108 and 110. As the mixture passes through the agglomerator the remaining entrained oil is reduced to nil. The oil separated by the element 104 drains by gravity to the bottom of the chamber 74 where, by pressure differential, the oil flows into conduit 121 which leads to manifold 24. The oil separated by the tertiary stage 106 drains from chamber 66 through conduit 123 to manifold 24. The remaining virtually oil-free air then passes from the chamber 66 into the final receiver storage compartment 56 by way of conduit 76.

When a predetermined pressure is reached in compartment 56 the compressor 12 assumes the unloaded condition. To initiate the unloaded condition the pressure sensing valve 34 actuates to supply a pressure signal to the inlet throttling valve 38 closing the same and preventing further through flow of gas in the compressor. Simultaneously, the pressure switch 40 operates to open valve 30 venting the separator compartment through conduit 28 and silencer 32 to atmosphere. The check valve 78 immediately closes due to the pressure in the receiver compartment 56. This closing of the check valve prevents the back flow into compartment 58 of air previously compressed and stored in the receiver storage compartment.

In the unloaded condition the compressor 12 consumes less power as there is no recompression of air trapped in the compressor and no substantial back pressure created by air compressed into the separator compartment 58. By venting the separator compartment 58, containing the oil reservoir, there is no tendency to flood the compressor 12 with oil through conduits 16 and 26 as these conduits are at atmospheric pressure. Only a small percentage of the oil required to operate the compressor during loaded condition is required to operate the compressor during unloaded conditions. This reduction in oil flow to the compressor is provided by the condition of a pressure differential between the compartment 58 and the injection port 22 of approximately 1 atmosphere while the compressor is running unloaded as opposed to a differential of 4 to 5 atmospheres when the compartment 58 is pressurized. Reduced oil flow during unloaded operation contributes to reduced power consumption and reduces vibration and noise which are caused by flooding the compressor with excess oil.

Figure 6:
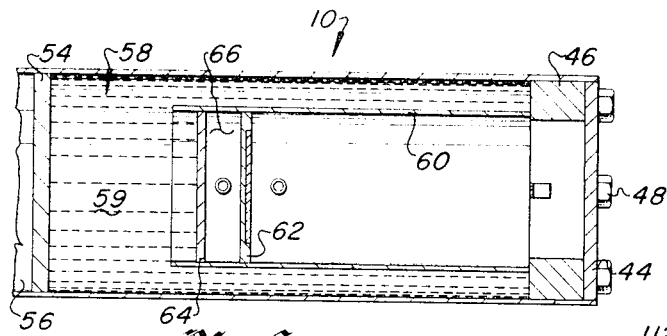
FIG. 6 is a sectional view taken along line 6—6 of FIG. 2 with the agglomerator element removed and showing the total oil surface exposed to the oil-air mixture entering the separator from the compressor.

It should be noted that under rapid recycling conditions there is a tendency for oil to foam up from the oil reservoir surface 59, thus enriching the air-oil mixture and creating increased difficulties for atmospheric venting. This problem is substantially reduced in the present invention by venting the compartment 58 through chamber 66 thus requiring all air vented to the atmosphere to flow through at least the secondary and tertiary separation stages. FIG. 4 shows the location of the conduit 28 in relation to the outer cylindrical wall 50, and the cylindrical shell 60 which forms the tertiary separation chamber 66. Also, foaming of the air-oil mixture on the oil surface 59 shown in FIG. 3 and FIG. 6 is substantially reduced by the cylindrical shell 60 covering the oil reservoir surface except for the portion between the transverse partition 54 and the baffle 64, thus limiting the available oil surface subject to foaming. Upon examination of FIG. 7 in conjunction with FIG. 2, it may be observed that oil immediately drains out of the secondary and tertiary separation chambers by way of conduits 121 and 123 and that the oil levels in these two chambers are not effected by the oil level 59 in the primary separation chamber 70, shown by FIG. 2 and FIG. 6.

Also, in accordance with the present invention access to the agglomerator element 102 is facilitated by merely removing the head 44 whereby replacement of the entire agglomerator element may be accomplished with ease.

Moreover, the present invention also provides an easily serviceable check valve which, as shown by FIG. 7, may be removed for servicing as a unit with the rod 98 by first removing the fasteners 84 thereby allowing immediate access and servicing of the check valve without resorting to any specialized tools or techniques.

The receiver-separator disclosed need not be limited to industrial air compressors, but could be applied to any number of applications having a flowing mixture of a gas and a liquid under pressure with the need for subsequent separation of the fluids.

What is claimed is:

1. A receiver-separator for a liquid injected gas compressor comprising:
    an elongated tank defining a closed vessel;
    partition means disposed in said tank sealingly dividing said tank into two separate compartments;
    one of said compartments comprising means for receiving a gas-liquid mixture under pressure;
    the other of said compartments comprising means for receiving and storing substantially liquid-free gas under pressure;
    said one compartment includes gas-liquid inlet means and vent means comprising a conduit opening from the exterior of said tank into said one compartment and valve means interposed in said conduit and operable to be opened to reduce the pressure of said gas-liquid mixture in said one compartment, said one compartment includes liquid separator means for separating liquid entrained in said gas-liquid mixture received therein, and said one compartment includes liquid reservoir means for receiving and storing liquid separated by said liquid separator means;
    said other compartment includes gas outlet means and means for sensing a predetermined pressure in said other compartment;
    conduit means opening from said one compartment into said other compartment;
    control means responsive to said means for sensing a predetermined pressure to open said valve means; and,
    check valve means disposed in said conduit means between said compartments operable to prevent the flow of a plurality of separation stages gas from said other compartment to said one compartment when said valve means is opened to reduce the pressure of said gas-liquid mixture in said one compartment.

2. The invention set forth in claim 1 wherein:
    said liquid separator means includes means forming a plurality of separtion stages for successively receiving a flow stream of a gas-liquid mixture and operating on said mixture to separate liquid therefrom, said plural separation stages including primary inertial separation means and secondary impingement separation means.

3. The invention set forth in claim 2 wherein:
    said inertial separation means includes a substantially cylindrical baffle mounted in said one compartment, said cylindrical baffle having an interior area comprising a primary separation chamber, and said gas-liquid inlet means comprises a conduit disposed in said one compartment to discharge said gas-liquid mixture tangentially against the inner wall of said baffle whereby said mixture is forced to flow in a vortiginous manner within said primary separation chamber.

4. The invention set forth in claim 2 wherein:
    said impingement separation means comprises a foraminous wall structure defining a hollow cylindrical element interposed in said one compartment in said gas-liquid flow stream between said primary separation chamber and said conduit opening from said one compartment into said other compartment.

5. The invention set forth in claim 4 wherein:
    said impingement separation element is disposed in a secondary separation chamber formed within said one compartment, said secondary separation chamber is defined by the interior area of a substantially cylindrical shell extending longitudinally within said one compartment from one end of said tank to a transverse partition intermediate the ends of said shell and said shell includes an opening into said secondary separation chamber in communication with said primary separation chamber.

6. The invention set forth in claim 5 wherein:
    said impingement separation means includes tertiary separation means comprising a transverse end wall of said cylindrical element located adjacent said transverse partition intermediate the ends of said shell and interposed between said foraminous wall structure defining said hollow cylindrical element and said conduit opening from said one compartment into said other compartment.

7. The invention set forth in claim 6 together with:
    tertiary chamber means formed between said transverse partition intermediate the ends of said shell and a transverse partition adjacent the end of said shell opposite said one end of said tank, and said tertiary chamber means is operable to receive liquid separated by said tertiary separation means.

8. The invention set forth in claim 7 together with:
    conduit means in communication with all of said separation chambers operable to drain said chambers, individually, of separated liquid.

* * * * *